United States Patent
Blakely et al.

(10) Patent No.: US 6,415,249 B1
(45) Date of Patent: Jul. 2, 2002

(54) METHOD AND SYSTEM FOR USING MACHINE TRANSLATION WITH CONTENT LANGUAGE SPECIFICATION

(75) Inventors: Jason Y. Blakely, Apex; Dennis D. King; Richard J. Redpath, both of Cary, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/516,523

(22) Filed: Mar. 1, 2000

(51) Int. Cl.[7] .................. G06F 17/28; G06F 17/20; G06F 15/16
(52) U.S. Cl. .................. 704/3; 704/8; 709/228
(58) Field of Search .................. 704/1–8; 709/219, 709/203, 206, 217, 227, 228, 229

(56) References Cited

U.S. PATENT DOCUMENTS

| | | | | |
|---|---|---|---|---|
| 5,884,246 A | * | 3/1999 | Boucher et al. | 704/2 |
| 5,974,372 A | * | 10/1999 | Barnes et al. | 704/8 |
| 6,119,078 A | * | 9/2000 | Kobayakawa et al. | 704/3 |
| 6,154,738 A | * | 11/2000 | Call | 707/4 |
| 6,247,048 B1 | * | 6/2001 | Greer et al. | 709/219 |
| 6,324,500 B1 | * | 11/2001 | Amro et al. | 704/8 |
| 6,347,316 B1 | * | 2/2002 | Redpath | 707/10 |

* cited by examiner

*Primary Examiner*—Patrick N. Edouardo
(74) *Attorney, Agent, or Firm*—A. Bruce Clay

(57) ABSTRACT

The Content-Language field in the entity-header of an HTTP response is used as the final factor in driving machine translation of text. The HTTP 1.1 specification defines the purpose of the value in this field to identify and differentiate entities according to a user's own preferred language. Its implication is that the content body is in the language defined via the Content-Language field. If the body content is only appropriate to a German-literate audience then typical use of this information would be to execute some processing to avoid rendering to someone other than that target. This information is used in rendering decisions. Herein, this value is a determining factor in the machine translation (MT) decision as well. It is still used in the rendering decision, but if the content is not currently in the desired language, it will be translated to it. Prior to the response being served, appropriate MT would be initiated based on this value. In addition to its current use, a new use of this field would be defined as the target language of MT as well as what language is appropriate for rendering. An HTML author (or a program that dynamically creates content) can do so in their language of choice only while the Content-Language field set during the HTTP response creation process defines what language the content should be dynamically translated into.

15 Claims, 5 Drawing Sheets

English content screen with instructions on how to use the reading comprehension system.

Welcome to the Learning System. The following instructions show how to...

(Next) — 200    (Finish) — 210

FIG. 2

German text for use by student. Screen's intent is for student to read for comprehension and then subsequent testing in English.

(Next) — 200    (Finish) — 210

FIG. 3

METHOD AND SYSTEM FOR USING MACHINE TRANSLATION WITH CONTENT LANGUAGE SPECIFICATION

FIELD OF THE INVENTION

This invention relates in general to computer software, and in particular to a method and system for using machine translation with content language specification.

BACKGROUND OF THE INVENTION

Machine Translation (MT) (i.e., the translation of text from a first language into a second language) is the designation for a well-known but little used technology. MT is currently provided by a number of vendors such as Systran, L&H, Transparent Languages, and others etc.. On-The-Fly (OTF) MT is a unique approach to MT introduced by IBM in their product WebSphere Application Server (WAS) 3.0 via the HTTP server for static HTML and CGIs. IBM OTF MT allows automatic MT initiated in a system by configuration, user preference, control data or other reasons, none of which require synchronous, direct human intervention. The mechanism for IBM OTF MT is based on configuration settings. In the current IBM OTF MT, there are three steps necessary to configure and use it:

1) Configuration settings are set by the administrator in the HTTP or WAS server, this authorizes the fact that MT is allowed;
2) The administrator then must define that a particular set of web sites, pages or content is eligible for translation. This enables the fact that MT is allowed.
3) A user then sets their browser language setting preference. This is a standard feature of most browsers. At this point, content to be served to this user will automatically be translated.

After these steps, content that is authorized and enabled and destined for a user that indicated a preference for a particular language will be translated OTF. These are the factors that initiate MT. This is a unique approach to OTF MT. The Accept-Language field of the request-header for an HTTP request is set by the browser based on user language preferences. This approach provides a user enabled yet administrator authorized solution that is very valuable. The present invention herein describes a unique and alternate solution to providing OTF MT that is still administrator authorized but now programmatically HTTP based. As defined herein programmatic means actions that are initiated by a computer program. There is no requirement on the user to set any preference or take any action. For the present invention the user is not involved in the MT decision.

SUMMARY OF THE INVENTION

The present invention continues to be based on an administrator authorized configuration, but now employs a new use for an HTTP response as the final factor in driving MT. In particular, the Content-Language field in the entity-header of the HTTP response is used. The HTTP 1.1 specification defines the purpose of the value in this field 'to identify and differentiate entities according to a user's own preferred language'. Its implication is that the content body is in the language defined via the Content-Language field. For example, if the body content is only appropriate to a German-literate audience then typical use of this information would be to execute some processing to avoid rendering to someone other than that target. This information is used in rendering decisions. It is proposed that this value be a determining factor in the MT decision as well. It is still used in the rendering decision, but if the content is not currently in the desired language, it will be translated to it. Prior to the response being served, appropriate MT would be initiated based on this value. In addition to its current use, a new use of this field would be defined as the target language of MT as well as what language is appropriate forrendering. Now an HTML author or a program that dynamically creates content can do so in only their language of choice while the Content-Language field set during the HTTP response creation process defines what language the content should be dynamically translated into. Known techniques for Language Guessing could be used to determine the source language. Normal use of the same Content-Language field would still be applicable in terms of its use to make target rendering decisions. This solution could be implemented in, for example, the IBM HTTP Server and/or the WebSphere Application Server or any other system that supports HTTP.

BRIEF DESCRIPTION OF THE DRAWINGS

For a more complete understanding of the present invention and for further advantages thereof, reference is now made to the following Detailed Description taken in conjunction with the accompanying drawings, in which:

FIG. 2 illustrates a first language content screen in accordance with the present invention;

FIG. 3 illustrates a second language screen in accordance with the present invention;

DETAILED DESCRIPTION OF THE INVENTION

Figure 1:
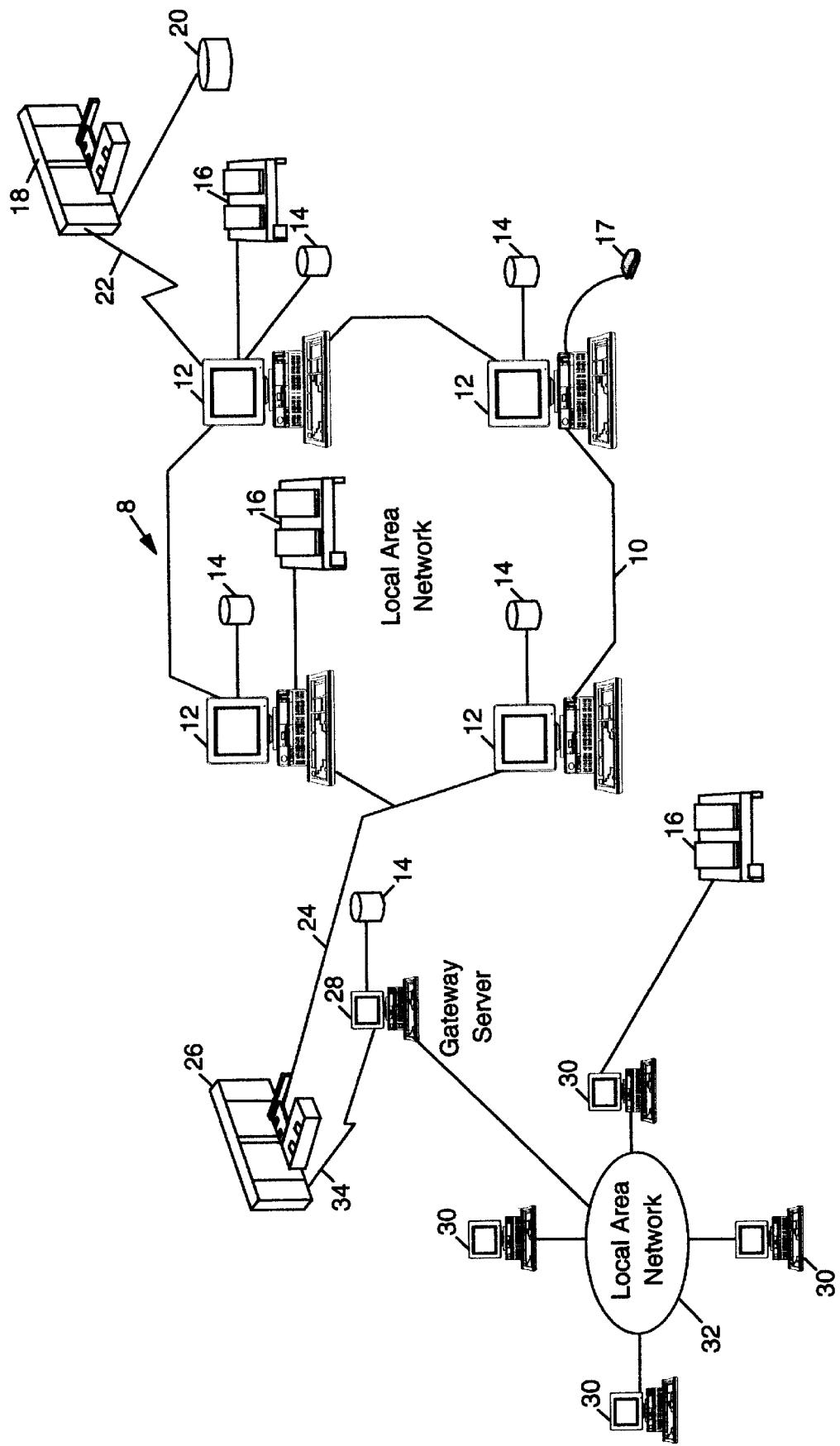
FIG. 1 is a pictorial representation of a data processing system which may be utilized to implement a method and system of the present invention.

Referring to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. Each said network may also consist of a plurality of processors coupled via a communications medium, such as shared memory, shared storage, or an interconnection network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

Figure 4:
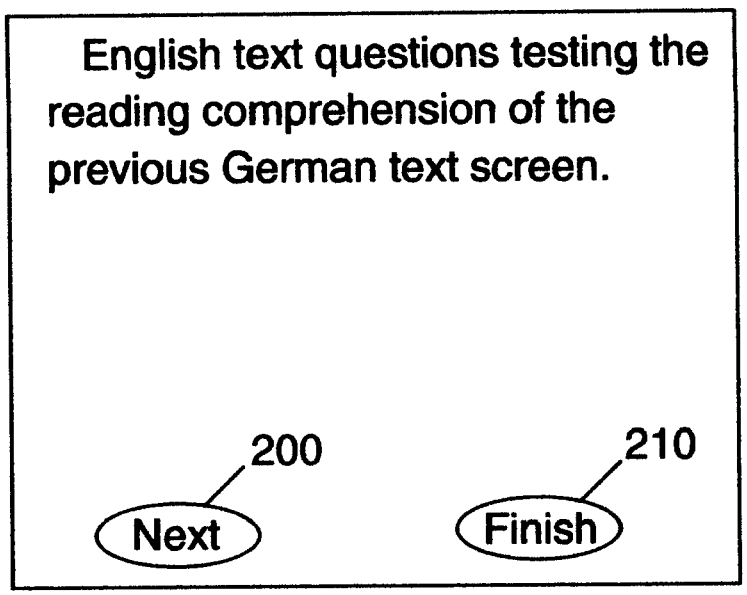
FIG. 4 illustrates a switch back into the first language.
Figure 5:
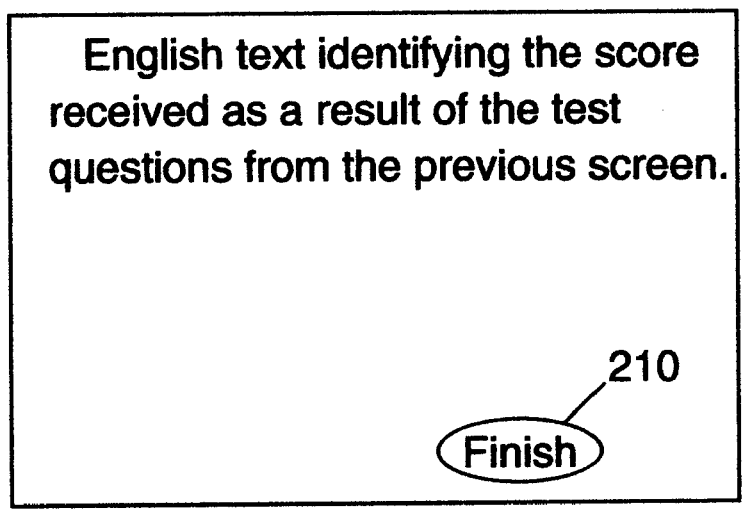
FIG. 5 illustrates a possible evaluation screen.

As an example, the following scenario is provided to explain use of the present invention. Consider an application that is used for training people how to read and comprehend a second language. For example, we will use an English speaker that is learning German. The educational system is server based and the user interacts or 'takes the class' through a browser. HTTP is the communication protocol between the server and the browser client. MT services, such as those in WAS 3.0 are available on the server. The scenario might begin with the user 'logging in' to the training application and identifying their name, native language (i.e., the source) and the language they are attempting to learn (i.e., the target). These source and target languages are saved and associated with the user. After log in, the application presents various instructions to the user in the source language (i.e. English) (see FIG. 2). All interaction with the user for the purpose of navigation or instruction or information is in the source language. At points in the application flow where the user is expected to learn or be tested in the target language, the target language will be presented. There would be, for example, a Next button 200 and a Finish button 210 at the bottom of each user interface screen. For example, use of this scenario in an application flow could be as follows:

1) Referring to FIG. 2, a source language interface is presented to the user to explain that the next screen will contain a paragraph in German. The objective is to read the paragraph for comprehension and subsequent testing will occur;
2) The Next button 200 is pressed and a paragraph of German text is presented (FIG. 3). The user reads the text for comprehension;
3) The Next button 200 is pressed again an a set of English language questions that test the user's comprehension are presented (FIG. 4);
4) The Finish button 210 is pressed and the answers to the questions are validated (FIG. 5).

To implement the above scenario, the present invention could be applied to the WAS 3.0 implementation of MT. The enhancement would key off the Content-Language data of the HTTP Response as the deciding factor in initiating MT rather than the Accept-Language field of the request-header for an HTTP request. The following describes the structure and flow of an application that implements the above scenario and how the present invention is applied to that application enabling administrator authorized and programmatically enabled MT. The application is composed of components that process the results of a screen request and then cause the next screen to be presented to a user. The component that is responsible for creating the screen that presents text for reading comprehension does so by building an HTTP Response to the input HTTP Request. For this new output screen the component sets the Content-Language field in the entity-header of the HTTP Response with the code that represent German (e.g. de). This is the programmatic indication to perform MT. The component then causes the Response to be served to the user. With, for example, the WAS 3.0 MT services enhanced with the present invention, automatic translation occurs. One important value of this approach is that any application can be developed with English only content but can be used to test reading comprehension of a user in any other language.

The present invention continues to be based on an administrator authorization configuration but also employs a new use for an HTTP response as the final factor in using Machine Translation. In particular, this solution uses the Content-Language field in the entity-header of the HTTP response. The HTTP 1.1 entity header specification for Content-Language, defines the value in this field to be used to identify and differentiate entities (i.e., HTML, GIF etc). Its implication is that the Entity body sent by the server is in the language defined via the Content-Language field.

This value could be a determining factor for the Machine Translation decision. A new use of this field is defined herein as a target language for Machine Translation. An HTML author or program that dynamically creates content can do so in their language of choice, and the Content-Language field set during the server HTTP response creation process would define what language the content should be dynamically translated to.

Figure 6:
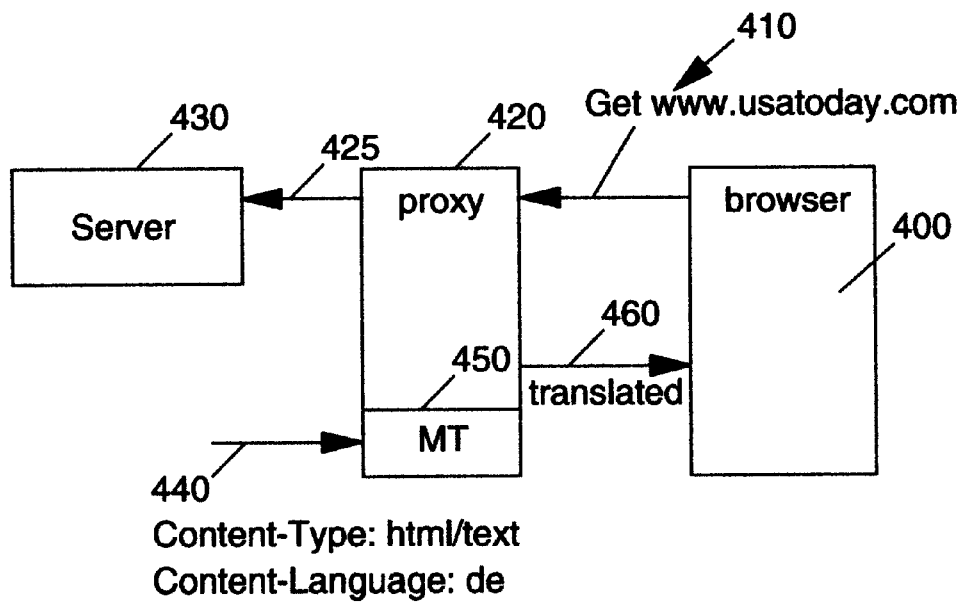
FIG. 6 illustrates one embodiment of the present invention.

The present invention employs a plurality of different techniques to use the Content-Language Header. The first is to use a proxy as illustrated in FIG. 6. At browser 400 a request 410 is sent to proxy 420. The proxy 420 sends to server 430 the request 410 from the browser 400 as indicated by an arrow 425. The server 430 delivers the page in whatever language it was created in to the proxy 420 as indicated by an arrow 440. The Language-Content Header has been set to German by a programmatic method. The proxy 420 uses the MT translation algorithm at 450 to translate the source content to German which is the target language specified in the Content-Language field. At 460 the requested page is delivered to the browser 400 in the required translated language.

Figure 7:
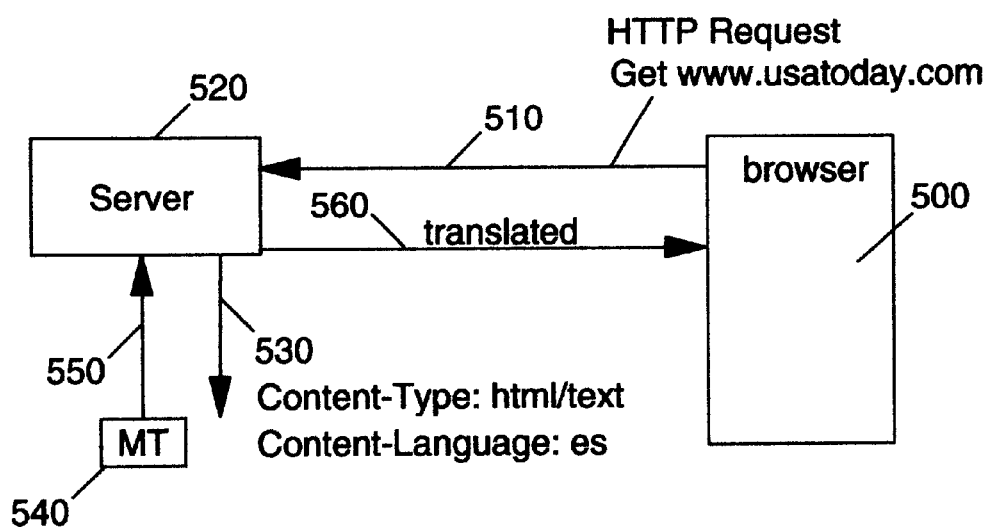
FIG. 7 illustrates a further embodiment of the present invention.

Referring to FIG. 7, an alternate embodiment of the present invention is illustrated. A server 520 determines that a user at browser 500 is required to receive data that is in Spanish. The source data to be sent, however, is not in Spanish. The data destined for the user is placed in an HTTP Response and the Content-Language field of the Response is set to indicate Spanish. The entire HTTP Response 530 is sent to a machine translation process (which can be part of the server process) with the HTTP Content-Language entity header along with the body of the entity to be translated or access to the body of the entity which is translated at 540 and returned at 550 to the server at 520 which delivers the translated media at 560 to the browser at 500.

Figure 8:
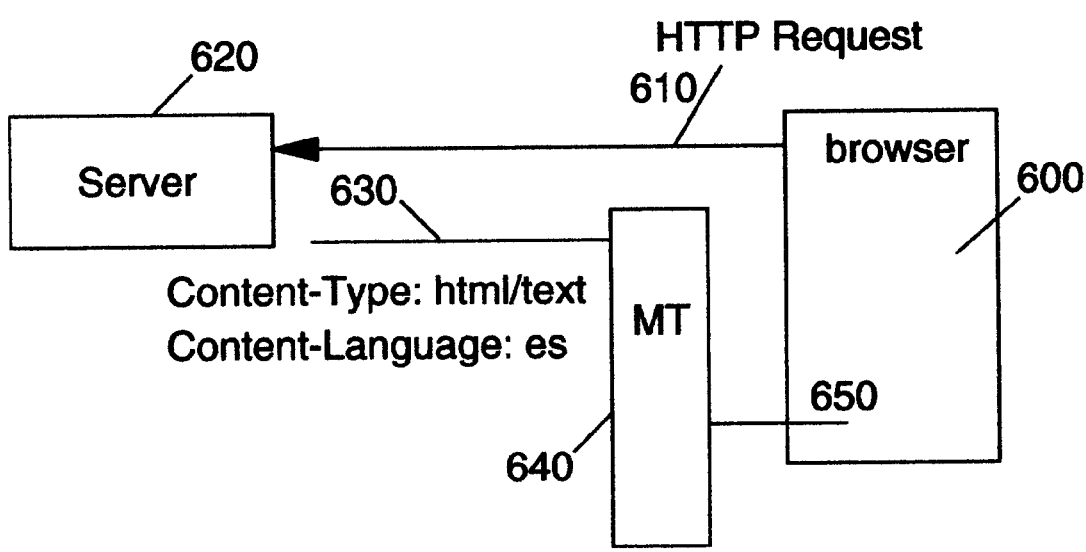
FIG. 8 illustrates a still further embodiment of the present invention.

Referring to FIG. 8, a further embodiment of the present invention is illustrated employing MT as part of the browser through the use of a plug-in. A server 620 determines that a user at a browser 600 is required to receive data that is in Spanish. The source data to be sent however is not in Spanish. A request 610 is sent to the server 620 which sends a response 630 to a MT plug-in 640 with the Content-Language entity header set to Spanish along with the body of the entity to be translated. The plug-in 640 then translates the source content into Spanish and passes it to the user.

Although the present invention has been described with respect to a specific preferred embodiment thereof, various changes and modifications may be suggested to one skilled in the art and it is intended that the present invention encompass such changes and modifications as fall within the scope of the appended claims.

What we claim is:

1. An HTTP response based method of determining a target language for automatic and programmatic translation of textual language from any language to any other language, comprising the steps of:

setting Content-Language in an entity header of an HTTP response with code that represents the target language;

initiating a machine translation process to translate the textual language; and providing said textual language to a user in the target language.

2. The method of claim 1, wherein said step of initiating a machine translation process to translate the textual language comprises:

translating the textual language at a proxy.

3. The method of claim 1, wherein said step of initiating a machine translation process to translate the textual language comprises:

translating the textual language with a browser plug-in.

4. The method of claim 1, wherein said machine translation process is co-located with a server.

5. The method of claim 1, wherein said machine translation process is at a location other than a server.

6. A system for determining a target language for automatic and programmatic translation of textual language from any language to any other language, comprising:

means for setting Content-Language in an entity header of an HTTP response with code that represents the target language;

means for initiating a machine translation process to translate the textual language; and means for providing said textual language to a user in the target language.

7. The system of claim 6, wherein said means for initiating a machine translation process to translate the textual language comprises:

means for translating the textual language at a proxy.

8. The system of claim 6, wherein said means for initiating a machine translation process to translate the textual language comprises:

means for translating the textual language with a browser plug-in.

9. The system of claim 6, wherein said machine translation process is co-located with a server.

10. The system of claim 6, wherein said machine translation process is at a location other than a server.

11. A computer program process recorded on computer readable medium for determining a target language for automatic and programmatic translation of textual language from any language to any other language, comprising:

computer readable means for setting Content-Language in an entity header of an HTTP response with code that represents the target language;

computer readable means for initiating a machine translation process to translate the textual language; and computer readable means for providing said textual language to a user in the target language.

12. The program product of claim 11, wherein said computer readable means for initiating a machine translation process to translate the textual language comprises:

computer readable means for translating the textual language at a proxy.

13. The program product of claim 11, wherein said computer readable means for initiating a machine translation process to translate the textual language comprises:

computer readable means for translating the textual language with a browser plug-in.

14. The program product of claim 11, wherein said machine translation process is co-located with a server.

15. The program product of claim 11, wherein said machine translation process is at a location other than a server.

* * * * *